(No Model.)
2 Sheets—Sheet 1.

J. R. RUSSELL.
BEATING-UP MACHINE FOR MAKING NAPPED HATS.

No. 251,471.
Patented Dec. 27, 1881.

Attest:
Herm. Lauten.
Geo. M. Finckel

Inventor:
James R. Russell
By Wm. H. Finckel
Attorney.

(No Model.)  J. R. RUSSELL.  2 Sheets—Sheet 2.

BEATING-UP MACHINE FOR MAKING NAPPED HATS.

No. 251,471.  Patented Dec. 27, 1881.

Attest:
Herm. Lauten.
Geo. M. Finckel

Inventor:
James R. Russell
By Wm. H. Finckel,
Attorney.

UNITED STATES PATENT OFFICE.

JAMES R. RUSSELL, OF BOSTON, MASSACHUSETTS.

BEATING-UP MACHINE FOR MAKING NAPPED HATS.

SPECIFICATION forming part of Letters Patent No. 251,471, dated December 27, 1881.

Application filed June 7, 1881. (No model.)

*To all whom it may concern:*

Be it known that I, JAMES R. RUSSELL, a citizen of the United States, residing at Boston, in the county of Suffolk and State of Massachusetts, have invented certain new and useful Improvements in Beating-Up Machines for Making Napped Hats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention is designed to substitute machinery for hand-labor in beating up napped hats for freeing the fur from the cotton used in forming the hat. In manual beating up the napped hats are taken one by one by the operator to the kettle, frequently dipped in the boiling water therein, and beaten with the stick until the cotton flows from the fur and the nap stands out clean and free from the cotton. This operation exposes the workman to the fumes and vapors from the kettle, subjects his hands to the boiling water in dipping, and requires very considerable skill.

One illustration of my invention consists in an intermittent rotary plank to receive the napped hat-bodies and present every portion of their surface for action to sticks arranged horizontally above them, which sticks are vibrated up and down over the hat-bodies to beat them up, combined with a hot-water supply to keep the hat-bodies on the plank in a wet condition to aid in separating the cotton and completing the work of beating up.

Figure 1:
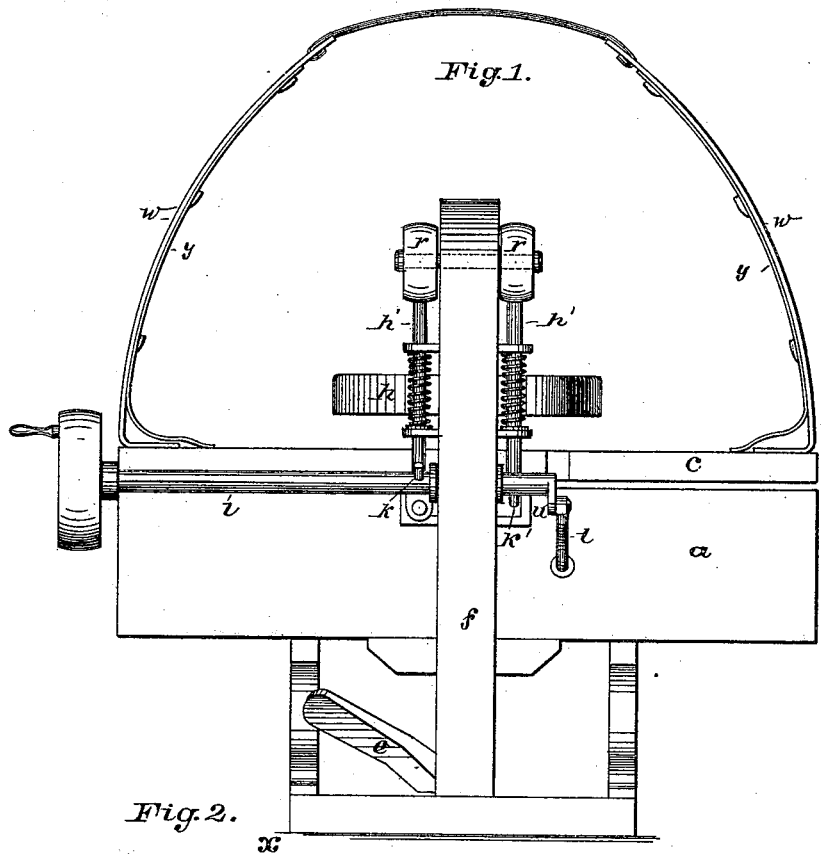
Figure 2:
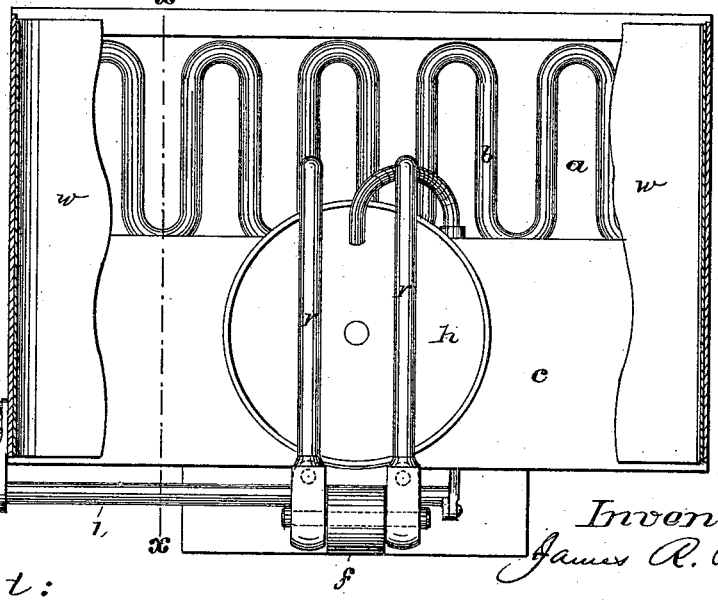
Figure 3:
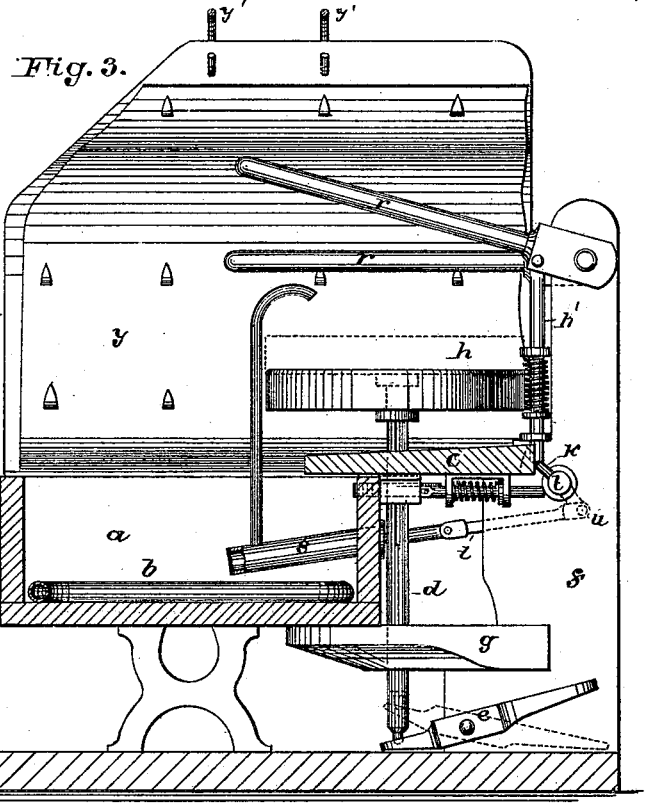
Figure 4:
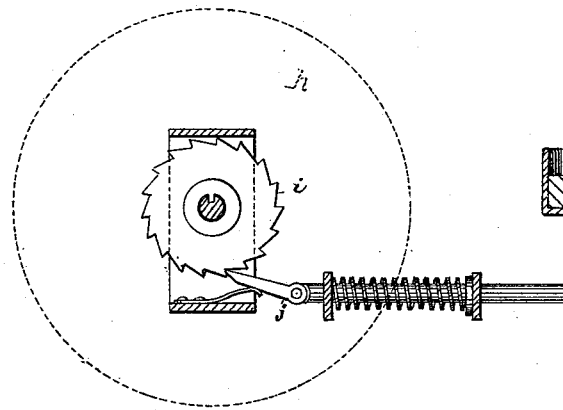
Figure 5:
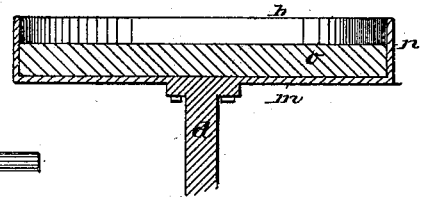

In the accompanying drawings, in the several figures of which like parts are similarly designated, Figure 1 is a front elevation of a machine embodying my invention. Fig. 2 is a top plan view with the side boards or fenders broken away. Fig. 3 is a longitudinal vertical section, some of the parts being in elevation.
Fig. 4 is a bottom plan view, showing the mechanism for intermittingly rotating the plank; and Fig. 5 is a cross-section of a preferred form of plank.

Supported upon a suitable frame is a tank or kettle, $a$, provided with a steam-coil or other heating apparatus, $b$, to keep the water hot in such tank. A hatter's plank or inclined table, $c$, is arranged at one end of this tank.

$d$ is a vertical spindle or shaft, stepped in a foot-lever, $e$, pivoted to a post, $f$, of the frame, and having a vertical movement through bearings in the plank $c$ and a portion of the framing by means of the foot-lever $e$. This shaft carries above the tank a second plank, disk, or table, $h$. An intermittent rotary or circular step-by-step motion is imparted to this plank or table by means of the engagement of a dog or pawl, $j$, with a ratchet-wheel, $i$, feathered in a supporting-bracket to the spindle, so as to permit of the spindle moving through it. The dog $j$ is operated to move the ratchet-tooth by means of a tappet, $k$, on a horizontal rotary shaft, $l$, borne by the framing.

The table or plank $h$ is made with a vertical flange, or is countersunk to form a cavity to hold water and napped hat-bodies. A preferred construction of this plank (which may be of any suitable shape) is illustrated in Fig. 5, where $m$ is a base of sheet or cast metal, having a vertical flange, $n$, about its perimeter and a wooden false bottom, $o$; or the flange may be secured to a wooden base. The requisites of the table are solidity sufficient to stand the mechanical beating-up process to keep the hats wet.

$p\ p$ are vertical spring-rods, supported in suitable brackets on, say, the post $f$. These rods are jointed to "sticks" $r$, pivoted to said post, and receive intermittent vertical elevation at different times by means of tappets $k$ $k'$, secured oppositely upon the shaft $l$, in order to simulate the motions of hand beating up. The sticks $r$ or hatters' pins are pivoted so as to project over the rotary plank or table $h$, and the springs of the rods $p\ p$ afford elastic supports for them in such manner as that their vibrations will have more or less tremor, which will be found very effective in clearing or separating the cotton.

$s$ is a pump taking hot water from the tank or kettle by means of its piston, operated by the rod $t$ from a crank or eccentric, $u$, on the shaft $l$, projecting it through the pipe $v$ on the hat-bodies contained on the rotary plank $h$, whereby the hat-bodies are kept wet, and, in fact, soaked, because of the water contained in the flanged plank. The provision of the hot-water supply obviates the necessity of dipping in the kettle.

On either side of the table c are arranged curved side boards or fenders w w, which, if made of wood or of metal lined with cloth y, and held together in an arch over the rotary table by hooks y', will absorb the water spattered by the operation of the beating-up sticks.

In operation the workman stands by the post f, and having placed the napped hat-bodies in the disk or plank h, the motion is imparted to the shaft l, which rotates such disk and vibrates the sticks. By depressing the foot-lever the plank is elevated to bring it into such proximity to the sticks as that they may exert their full beating-up force on the hat-bodies. At the same time jets or streams of hot water are being thrown upon the hat-bodies and into the plank by means of the pump. The water in the plank acts as an elastic cushion for the hat-bodies while being beaten, and also aids in separating or clearing out the cotton from the lower side while the upper side is being beaten. The table is lowered and the hat-bodies taken out and crozed on the plank C as required, and new ones put in. The rotation of the table h serves to bring every portion of the hat-bodies under the action of the sticks and hot water.

By my machine the beating up is done thoroughly, expeditiously, and economically.

What I claim is—

1. The combination of a water-fed plank and vibratory beating-up sticks for mechanically "dipping" and "beating up" napped hat bodies, substantially as described.

2. A machine for dipping and beating up napped hat-bodies, consisting of a rotary plank to receive the napped hat-bodies and present every portion of their surface for the beating-up action, combined with vibratory sticks to beat up the naps and with a hot-water supply, substantially as described.

3. An intermittently-rotated plank, combined with vibrating beaters and adapted to be adjusted relatively to said beaters, substantially as and for the purpose described.

4. In machinery for beating up hats, beaters, a rotary plank, and a hot-water supply operated from the same shaft, substantially as and for the purpose described.

5. The fenders or side boards arranged alongside the plank of a beating-up machine to take and confine the splash, substantially as described.

6. Organized machinery for beating up napped hats, the same consisting in a hot-water tank or kettle, a rotary plank, vibratory beating-up sticks, and a hot-water supply as a substitute for dipping, substantially as described.

7. The method of beating up napped hats, the same consisting in subjecting them to the action of vibratory sticks upon a rotary water-fed bed, whereby the cotton is readily separated, substantially as described.

In testimony whereof I affix my signature in presence of two witnesses.

JAMES R. RUSSELL.

Witnesses:
WM. H. FINCKEL,
GEO. M. FINCKEL.